United States Patent
Ducarne et al.

(10) Patent No.: US 10,207,823 B2
(45) Date of Patent: Feb. 19, 2019

(54) DEPLOYABLE ASSEMBLY

(71) Applicant: THALES, Courbevoie (FR)

(72) Inventors: Julien Ducarne, Cannes (FR); Julien Grave, Cannes (FR); Xavier Reutenauer, Cannes (FR)

(73) Assignee: THALES, Courbevoie (FR)

( * ) Notice: Subject to any disclaimer, the term of this patent is extended or adjusted under 35 U.S.C. 154(b) by 79 days.

(21) Appl. No.: 15/263,068

(22) Filed: Sep. 12, 2016

(65) Prior Publication Data

US 2017/0088292 A1 Mar. 30, 2017

(30) Foreign Application Priority Data

Sep. 25, 2015 (FR) ..................................... 15 01981

(51) Int. Cl.
| | | |
|---|---|---|
| *B64C 1/22* | (2006.01) | |
| *B64G 1/22* | (2006.01) | |
| *B64G 1/10* | (2006.01) | |
| *B64G 1/44* | (2006.01) | |

(52) U.S. Cl.
CPC ............... *B64G 1/222* (2013.01); *B64G 1/10* (2013.01); *B64G 1/44* (2013.01); *B64G 1/443* (2013.01)

(58) Field of Classification Search
CPC . B64G 1/222; B64G 1/44; B64G 1/58; B64G 1/443; B64G 1/446; F16M 11/10; F16M 11/04; F16M 11/2021; F16M 13/00
See application file for complete search history.

(56) References Cited

U.S. PATENT DOCUMENTS

| | | | | |
|---|---|---|---|---|
| 5,014,936 A | * | 5/1991 | Nauck ...................... | B64G 1/10 244/172.7 |
| 5,314,146 A | * | 5/1994 | Chicoine .................. | B64G 1/10 244/159.4 |
| 5,344,104 A | * | 9/1994 | Homer ..................... | B64G 1/10 244/158.1 |
| 5,520,747 A | * | 5/1996 | Marks ..................... | B64G 1/222 136/245 |
| 5,697,582 A | | 12/1997 | Surauer et al. | |

(Continued)

FOREIGN PATENT DOCUMENTS

| | | |
|---|---|---|
| EP | 0 716 365 A2 | 6/1996 |
| EP | 2 468 630 A2 | 6/2012 |
| JP | 2008-221876 A | 9/2008 |

*Primary Examiner* — Timothy D Collins
*Assistant Examiner* — Tye William Abell
(74) *Attorney, Agent, or Firm* — Baker & Hostetler LLP (57) ABSTRACT

A deployable assembly comprises a supporting structure, a set of panels, each being linked to the adjacent panel by a hinge defining an intermediate axis of rotation, capable of switching from a stowed configuration in which the panels are folded one on top of the other to a deployed configuration, by rotation of the panels about the respective intermediate axes of rotation, wherein the panels are arranged substantially in the same plane, an articulation device defining a main axis of rotation of the set of panels relative to the supporting structure. The set of panels is rotationally mobile about the intermediate axes of rotation and the main axis of rotation to switch from the stowed configuration to the deployed configuration and the set of panels is only rotationally mobile about the main axis of rotation in deployed configuration to orient the set of panels relative to the supporting structure.

6 Claims, 4 Drawing Sheets

(56) References Cited

U.S. PATENT DOCUMENTS

| | | | | |
|---|---|---|---|---|
| 5,833,175 A * | 11/1998 | Caplin | B64G 1/10 244/158.1 |
| 5,927,654 A * | 7/1999 | Foley | B64G 1/222 244/172.6 |
| 6,038,736 A * | 3/2000 | Nygren | B64G 1/222 16/221 |
| 6,102,339 A * | 8/2000 | Wu | B64G 1/503 244/171.8 |
| 8,757,554 B1 * | 6/2014 | Harvey | B64G 1/222 244/172.7 |
| 9,352,855 B2 * | 5/2016 | Wong | B64G 1/503 |
| 9,573,702 B1 * | 2/2017 | Jacomb-Hood | B64G 1/24 |
| 9,758,260 B2 * | 9/2017 | Halsband | B64G 1/222 |
| 2003/0057328 A1 * | 3/2003 | Maruno | B64G 1/10 244/158.1 |
| 2003/0121639 A1 * | 7/2003 | Nomura | B64G 1/506 165/41 |
| 2005/0230558 A1 * | 10/2005 | Nakasuka | B64G 1/10 244/159.5 |
| 2006/0016935 A1 * | 1/2006 | Jordan | B64G 1/10 244/159.4 |
| 2006/0049317 A1 * | 3/2006 | Reutenauer | B64G 1/222 244/172.9 |
| 2006/0105706 A1 * | 5/2006 | Huang | B64G 1/10 455/12.1 |
| 2007/0029446 A1 * | 2/2007 | Mosher | B64G 1/10 244/158.1 |
| 2012/0325974 A1 * | 12/2012 | Baudasse | B64G 1/222 244/172.6 |
| 2013/0200221 A1 * | 8/2013 | Goodzeit | B64G 1/58 244/171.8 |
| 2014/0239124 A1 * | 8/2014 | Aston | B64G 1/10 244/171.7 |
| 2015/0217876 A1 * | 8/2015 | Halsband | B64G 1/10 244/172.6 |
| 2016/0001896 A1 * | 1/2016 | Nann | B64G 1/443 244/172.6 |
| 2016/0311561 A1 * | 10/2016 | Lemaire | B64G 1/44 |
| 2016/0380580 A1 * | 12/2016 | Atwater | B64G 1/44 244/158.4 |

* cited by examiner

DEPLOYABLE ASSEMBLY

CROSS-REFERENCE TO RELATED APPLICATION

This application claims priority to foreign French patent application No. FR 1501981, filed on Sep. 25, 2015, the disclosure of which is incorporated by reference in its entirety.

FIELD OF THE INVENTION

The present invention relates to a deployable assembly comprising a supporting structure and a set of panels, for example a satellite and a solar generator made up of several solar panels. It applies notably to the field of space equipment which has to be deployed in orbit and more particularly to space equipment for satellites, such as solar generators. Nevertheless, the deployable assembly according to the invention can be applied to any other field where it is necessary to articulate one or more panels relative to an object. The panel can be rigid or flexible.

BACKGROUND

A solar generator is made up of deployable and orientable solar panels. A solar panel is an energy technology device consisting of photovoltaic solar collectors intended to convert solar radiation into electrical energy. On a satellite, the solar generator makes it possible to ensure the input of electrical energy and to make the hardware on board thereof operate. A solar generator can be mounted on a satellite that requires accurate aiming as is the case for a high-resolution observation satellite. The solar panels can exhibit low-frequency vibration modes that are undesirable because they disrupt the control of the line of sight. An observation satellite often aims towards the earth. By contrast, the solar panels do not always see the sun, which poses an energy input problem. To counter this problem it is possible to mount more solar panels on the satellite, but this solution presents the drawback of an excess of weight and bulk, above all upon the launching of the satellite which is contained in the nose cone of the rocket.

There are satellites that can be oriented according to their phase of activity. In observation phase, the satellite is fully oriented towards the Earth's surface, and a reduced solar flux reaches the solar generator. In energy storage phase, the satellite is oriented so that its solar panels are oriented optimally towards the sun, that is to say with the surface normal to the rays. Nevertheless, when the satellite passes over its station on the ground, it is reoriented towards the latter in order to transfer to it the information from its mission. It is therefore difficult to reconcile the observation mission with energy recharging.

Furthermore, the satellite turns its back to the sun and the telescope looks at cold space at a temperature of approximately 3 kelvin, instead of looking towards the earth i.e. towards an environment with a temperature of approximately 10 to 30° C. These situations complicate the regulation and the thermal design of the telescope.

Moreover, when the satellite has its back to the sun, the cavity of the telescope is sometimes facing the "relative wind" linked to the orbital speed. Particles from this environment can erode or deform the internal components of the cavity. Over the required life span of the telescope, it is possible to make the telescope robust to such environmental stresses, but that means a higher demand for telescope quality, thereby implying additional costs.

Some satellites have two articulation arms. One of the arms is situated in the plane of the solar panels and allows for the deployment of the solar panels from the configuration stowed on the satellite to the deployed configuration. The second arm is motorized and makes it possible to orient the generator towards the sun, the second arm being terminated for example by two branches, the arm is linked to the satellite, the two branches are linked to the solar generator. The arm allows for a 360° rotation of the solar generator. Thus, it is possible for the satellite to orient itself so as to aim completely towards the ground and to orient its solar generator towards the sun to ensure the energy input. However, this solution requires the presence of two articulations between the satellite and the solar generator: the articulation dedicated to the deployment of the solar panels and the articulation dedicated to the orientation of the solar generator. This configuration is not optimal for the stiffness of the solar generator: the taking of images must be performed very accurately. The satellite must be able to change attitude, sometimes rapidly, with a good stability and have a high aiming accuracy. The presence of two articulations between the satellite and the solar generator generates a damping problem. In effect, during the change of attitude of the satellite, the solar generator can then be subjected to a first bending mode excited by the manoeuvre of the satellite but uncontrolled by the motorized arm ensuring the orientation of the solar generator. The vibrations then make it difficult to stabilize the aiming.

SUMMARY OF THE INVENTION

The invention aims to mitigate all or some of the above-mentioned problems by proposing a deployable assembly with a single articulation, that is to say without a second orientation arm, making it possible to gain in rigidity or best control vibrations.

To this end, the subject of the invention is a deployable assembly comprising:
  a supporting structure,
  a set of panels, each of the panels being linked to the adjacent panel by a hinge defining an intermediate axis of rotation, capable of switching from a stowed configuration in which the panels are folded one on top of the other to a deployed configuration, by rotation of the panels about the respective intermediate axes of rotation, in which the panels are arranged substantially in the same plane,
  an articulation device defining a main axis of rotation of the set of panels relative to the supporting structure,
  characterized in that the set of panels is rotationally mobile about the intermediate axes of rotation and the main axis of rotation to switch from the stowed configuration to the deployed configuration and in that the set of panels is only rotationally mobile about the main axis of rotation in deployed configuration so as to orient the set of panels relative to the supporting structure.

According to one embodiment, each of the panels having edges, the main axis of rotation is on a first edge of a first of the panels and the intermediate axes of rotation are on non-adjacent edges.

According to another embodiment, the main axis of rotation and the intermediate axes of rotation are parallel axes.

According to another embodiment, the main axis of rotation being on a first edge of a first of the panels, the articulation device comprises two bearings on the first edge of the first panel so as to render the set of panels rotationally mobile about the main axis of rotation.

According to another embodiment, the articulation device comprises a first bearing on the first edge of the first panel, the articulation device comprises a control device comprising a gear motor coupled to the first bearing intended to orient the set of panels, and the control device comprises at least one damper coupling the gear motor and the first bearing.

According to another embodiment, the deployable assembly comprises a sensor capable of determining the position of the set of panels, and it comprises a servo controlling of the gear motor as a function of the position of the set of panels about the main axis of rotation.

According to another embodiment, the articulation device comprises a second bearing on the first edge of the first panel, and the control device comprises a prestressing means associated with the second bearing making it possible to avoid any play in the first bearing and the second bearing.

According to one particular embodiment, the panels of the deployable assembly are solar panels and the supporting structure is a satellite.

BRIEF DESCRIPTION OF THE DRAWINGS

The invention will be better understood and other advantages will become apparent on reading the detailed description of one embodiment given by way of example, the description being illustrated by the attached drawing in which.

For the sake of clarity, the same elements will bear the same references in the different figures.

DETAILED DESCRIPTION

The invention is described in the field of space equipment, in the case where the panels are solar panels forming a solar generator and the supporting structure is a satellite. Obviously, the invention can be applied to any other field in which a set of panels is liked to a supporting structure to form a deployable assembly, for example a set of telecommunications antenna panels.

In this application, it is a question of a set of panels, each of the panels being linked to the adjacent panel by a hinge defining an intermediate axis of rotation, capable of switching from a stowed configuration in which the panels are folded one on top of the other to a deployed configuration, by rotation of the panels about the respective intermediate axes of rotation, in which the panels are arranged substantially in the same plane. The set of panels is linked to a supporting structure along an edge of one of the panels, called first panel, by a main link defining a main axis of rotation. And each panel is linked along one of its edges to it neighbouring panel by an intermediate link defining an intermediate axis of rotation. Each panel is therefore rotationally mobile about its intermediate link and the set of panels is rotationally mobile about its main link. In stowed configuration, the panels are folded one on top of the other and are stacked on a face of the supporting structure. The stowed configuration makes it possible to stow away the set of panels, notably during the stationing of the satellite when the latter is stowed under the nose cone of the rocket, in a restricted space. In deployed configuration, the panels are arranged substantially in the same plane. To switch from the stowed configuration to the deployed configuration, the first panel has performed a rotational movement about the main link and each of the panels has performed a rotational movement about its intermediate link. The deployed configuration corresponds to the operational configuration of the set of panels. In other words, it is in deployed configuration that the set of panels is oriented according to the needs of the satellite. The set of panels in deployed configuration is oriented towards the sun when there is need to convert solar radiation into electrical energy. While remaining in deployed configuration, this orientation is required to be modified to retain an optimal orientation of the solar panels relative to the sun, notably when the satellite is moving in its orbit. The deployed configuration can also be called operational configuration. In other words, in the deployed configuration the panels fulfil the function for which they are intended: the solar sensors supply electrical energy, the antenna panels receive or send electromagnetic radiation, etc. In the stowed configuration, the panels are arranged one against the other, for example in the satellite launch phase to allow them to fit into the nose cone of a launch vehicle.

Moreover, in the context of an application in the space equipment field, the panels can be rigid or flexible. In the case of a flexible panel, it is possible to have a set of panels comprising, for example, at least one tape measure supporting a flexible membrane. The flexible membrane corresponds to panel. In this example, the invention is to be understood by analogy. The stowed configuration in which the panels are folded one on top of the other and stacked on a face of the supporting structure is to be understood as a configuration in which the tape measure and the panel, that is to say the flexible membrane, are wound around a mandrill and stowed in a face of the supporting structure. And, similarly, to switch from the stowed configuration to the deployed configuration, the first panel performs a rotational movement about the main link. In other words, the flexible membrane switches to deployed configuration by deployment of a tape measure by performing a rotational movement about the mandrill.

Figure 1:
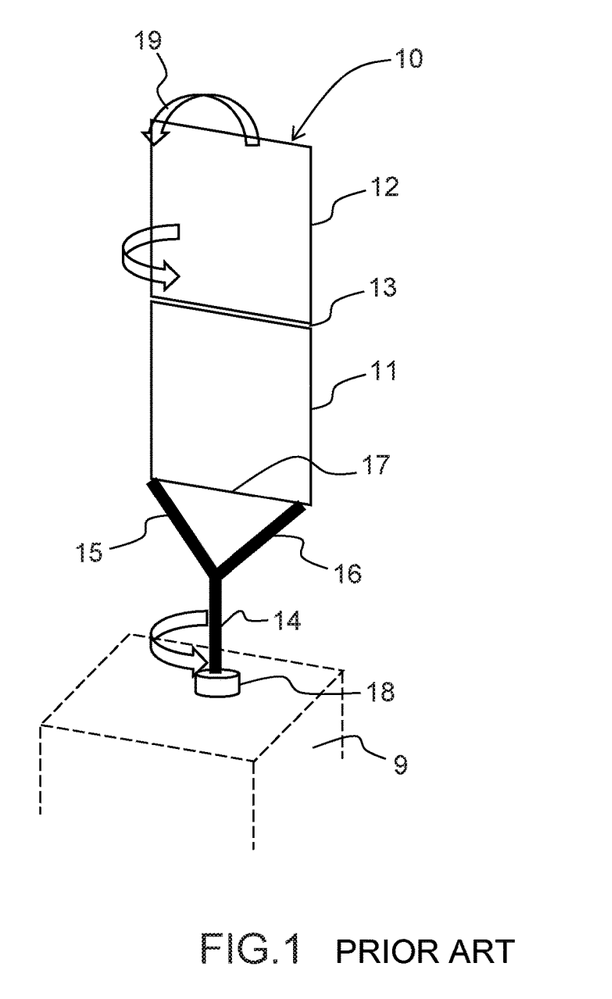
FIG. 1 schematically represents a deployable and orientable set of panels according to the prior art, FIG. 2 schematically represents a deployable and orientable set of panels according to the invention.

FIG. 1 schematically represents a set 10 of deployable and orientable panels 11, 12 according to the prior art. In this example, only two panels 11 and 12 are represented. Obviously, the set 10 can also comprise one or more other panels. The set 10 comprises an intermediate link defining an intermediate axis of rotation 13 of the panel 12 relative to the first panel 11. The set 10 of panels is linked to a supporting structure 9, represented schematically by dotted lines in the figure, by an arm 14 extended towards the set 10 of panels by two arms 15, 16. The arms 15, 16 are linked to the first edge 17 of the first panel 11. The arm 14 is linked to a control device 18 which makes it possible to orient the set 10 of panels towards the sun. The arm 14 associated with the control device 18 allows for a 360° rotation of the set 10 of the panels. Thus, it is possible for the satellite to orient itself so as to aim completely towards the ground and to orient the set of panels 11, 12 towards the sun to ensure the energy input. According to the prior art, there is therefore an articulation dedicated to the deployment of the panels and an articulation dedicated to the orientation of the set 10 of panels 11, 12. This configuration is not optimal for the stiffness of the set 10 of panels. In effect, when the satellite changes attitude, it must have high aiming accuracy at the level of the on-board telescope. The presence of two articulations between the satellite and the set 10 of panels generates a damping problem. In effect, during the change of attitude of the satellite, the set of panels may then be subjected to a first bending mode, symbolized by the arrow 19, excited by the manoeuvre of the satellite but not controlled by the motorized arm 14 ensuring the orientation of the set 10 of panels.

Figure 2:
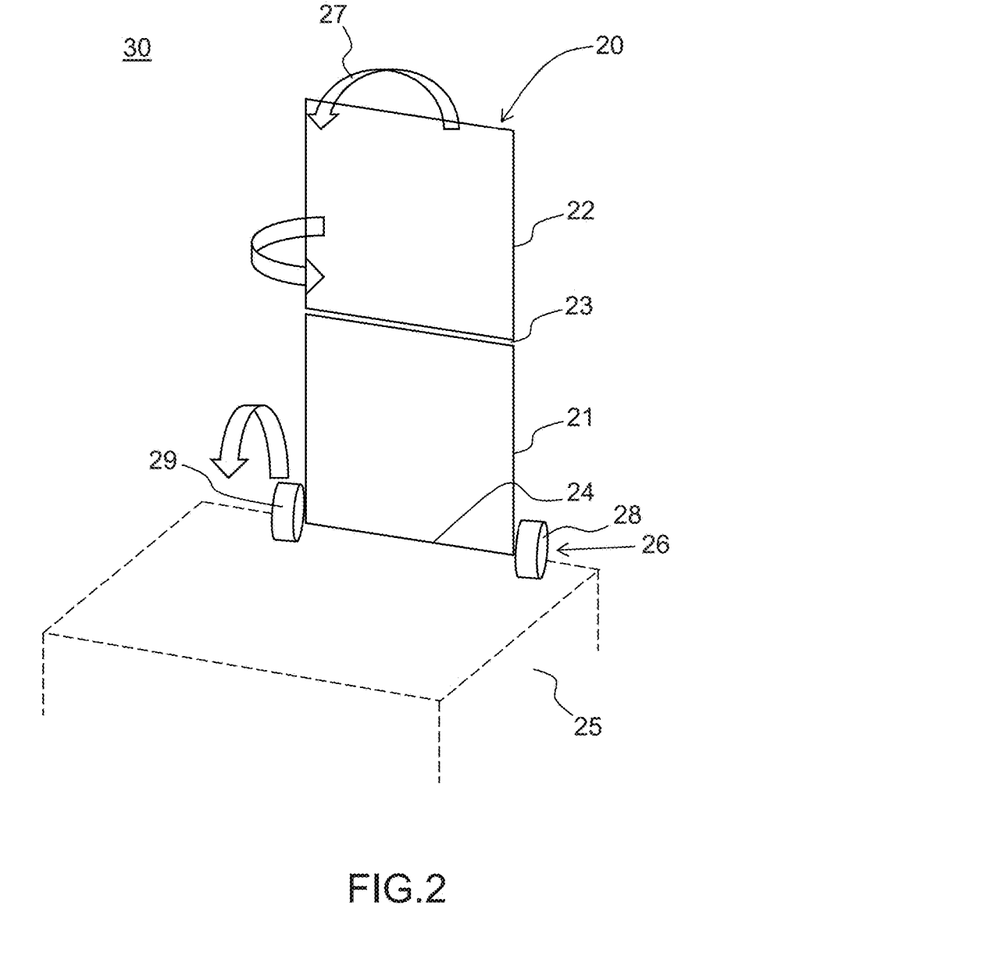

FIG. 2 schematically represents a deployable assembly 30 according to the invention. The deployable assembly 30 comprises a supporting structure 25, a set 20 of deployable and orientable panels 21, 22. In this example, only two panels 21 and 22 are represented. Obviously, the set 20 can also comprise one or more other panels. The set 20 comprises an intermediate link defining an intermediate axis of rotation 23 of the panel 22 relative to the first panel 21. The set 20 comprises a main link defining a main axis of rotation 24 of the panel 21 relative to the supporting structure 25 represented by dotted lines in the figure. Each of the panels 21, 22 is linked to the adjacent panel by a hinge defining the intermediate axis of rotation 23. The set 20 is capable of switching from a stowed configuration in which the panels 21, 22 are folded one on top of the other to a deployed configuration, by rotation of the panels 21, 22 about the respective intermediate axis of rotation, in which the panels 21, 22 are arranged substantially in the same plane. The deployable assembly 30 comprises an articulation device 26 defining the main axis of rotation 24 of the set 20 of panels 21, 22 relative to the supporting structure 25. According to the invention, the main axis of rotation is on a first edge of a first 21 of the panels on a face of the supporting structure 25. The set 20 of panels 21, 22 is rotationally mobile about the intermediate axes of rotation 23 and the main axis of rotation 24 to switch from the stowed configuration to the deployed configuration and the set 20 of panels 21, 22 is only rotationally mobile about the main axis of rotation 24 in deployed configuration so as to orient the set 20 of panels 21, 22 relative to the supporting structure 25. It is therefore in deployed configuration, that is to say in operational configuration, that the set 20 of panels 21, 22 can be oriented about the main axis of rotation 24. As explained previously, during the change of attitude of the satellite, the set 20 of panels 21, 22 may be subjected to a first bending mode, symbolized in this figure by the arrow 27, excited by the manoeuvre of the satellite but is, by virtue of the invention, controlled by the articulation device 26 ensuring the orientation of the set 20 of panels 21, 22. In deployed configuration, the rotation of the set 20 of panels 21, 22 takes place about the one and only main axis of rotation 24. There is no other articulation which intervenes in the rotation of the set 20 of panels 21, 22. In other words, the deployment of the panels 21, 22, then, once deployed, the orientation of the set 20 of the panels 21, 22 are done on a single axis, the main axis of rotation 24. This configuration is simple and makes it possible to obtain a good rigidity of the set 20 on the supporting structure, even when the panels are deployed and the satellite changes attitude.

As already mentioned, the invention is not limited to a deployable assembly 30 comprising a set of panels 20 comprising two panels 21, 22. Each of the panels has edges, and the main axis of rotation is on a first edge of a first panel and the intermediate axes of rotation are advantageously on non-adjacent edges. This is notably the case with rectangular panels as represented in FIG. 2, but it is true for any panel of polygonal form of a degree greater than or equal to 4, that is to say with 4 edges or more.

Advantageously, and as represented in FIG. 2, the main axis of rotation 24 and the intermediate axes of rotation 23 are parallel axes. That is true for rectangular panels, but the main axis of rotation 24 and the intermediate axes of rotation 23 can also be parallel for panels of pentagonal, hexagonal, etc. form.

As represented in FIG. 2, the articulation device can comprise two bearings 28, 29 on the first edge of the first panel 21 so as to render the set 20 of panels 21, 22 rotationally mobile about the main axis of rotation 24.

Figure 3:
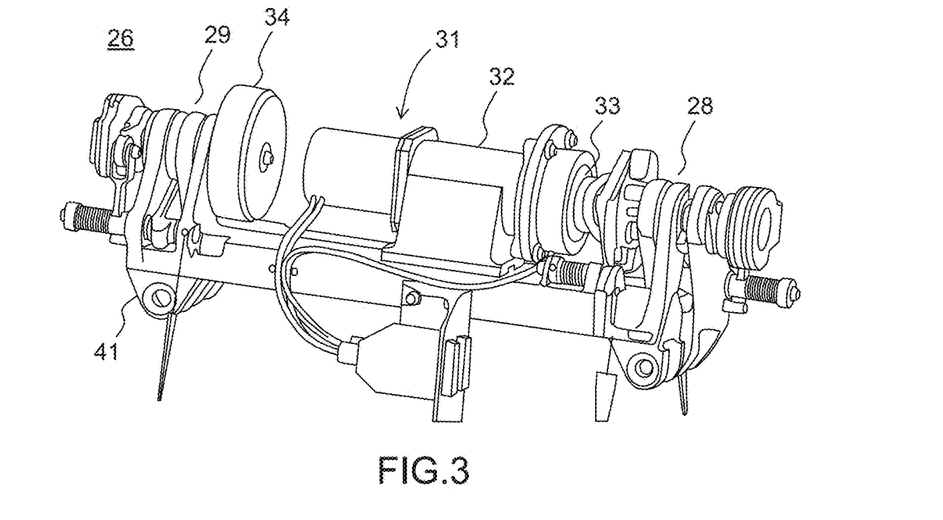
FIG. 3 represents a device for articulating a set of panels relative to a supporting structure, FIG. 4 schematically represents a servo control loop for controlling a gear motor as a function of the position of the set of panels according to the invention.

FIG. 3 shows in more detail an example of a device 26 for articulating a set 20 of panels 21, 22 relative to the supporting structure 25. The articulation device 26 can comprise a first bearing 28 on the first edge of the first panel 21. The articulation device 26 can comprise a control device 31 comprising a gear motor 32 coupled to the first bearing 28 intended to orient the set 20 of panels 21, 22. The control device 31 comprises at least one damper 33 coupling the gear motor 32 and the first bearing 28. The purpose of the damper 33 is to introduce a passive damping in the link between the gear motor 32 and the first bearing 28. In other words, the damper 33 serves to limit, even eliminate, the vibrations present on the gear motor when the latter orients the set 20 of panels via the first bearing 28. The damper 33 can for example be a part made of flexible material such as rubber or plastic to damp vibrations of low amplitudes, a spring or preferentially a visco-elastic insert.

According to one preferential embodiment, the articulation device 26 can comprise a second bearing 29 on the first edge of the first panel 21, and the control device 31 can comprise a pre-stressing means 34 associated with the second bearing 29 making it possible to avoid any play in the first bearing and the second bearing 28, 29. The pre-stressing means 34 constitutes an anti-play system through the tensioning of the articulation device 26 and the set 20 of panels 21, 22. The pre-stressing means can prestress the damper 33 and thus improves the control of the set 20 of panels 21, 22.

Figure 4:
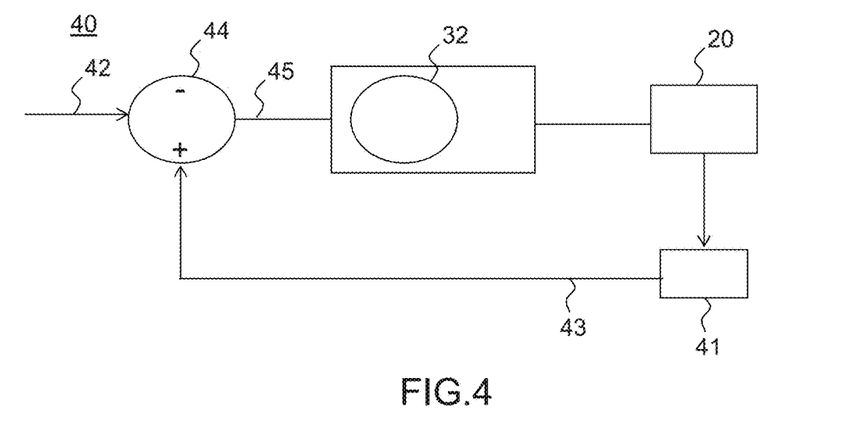

FIG. 4 schematically represents a servo control loop 40 for controlling the gear motor 32 as a function of the position of the set 20 of panels 21, 22 about the main axis of rotation, according to the invention. The deployable assembly 30 comprises a sensor 41, visible in FIG. 3, capable of determining the position of the set 20 of panels 21, 22. The deployable assembly 30 comprises a servo controlling of the gear motor 32 as a function of the position of the set 20 of panels 21, 22. A setpoint 42 is transmitted to the gear motor 32 to orient the set 20 of panels. The sensor 42 determines the position of the set 20 of panels. The information 43 on the position of the set 20 of panels is transmitted to a comparator 44 which compares the information 43 to the setpont 42. If the information 43 is different from the setpoint 42, the comparator 44 transmits a correction 45 to the gear motor so as to correct the orientation of the set 20 of panels. Thus, by virtue of the servo control loop, an accurate orientation of the set 20 of panels is ensured. The sensor 41 can, for example, be an optical sensor which determines the position of the set 20 of panels 21, 22. The sensor 41 can also be a load sensor which determines, from the perceived force, the position of the set 20 of panels 21, 22. This control loop will also advantageously be able to receive a setpoint created by the attitude control system of the satellite itself which comprises other sensors. In other words, it is possible to envisage the servo control loop 40 as being a sub-loop of the attitude and orbit control system of the satellite.

Figure 5:
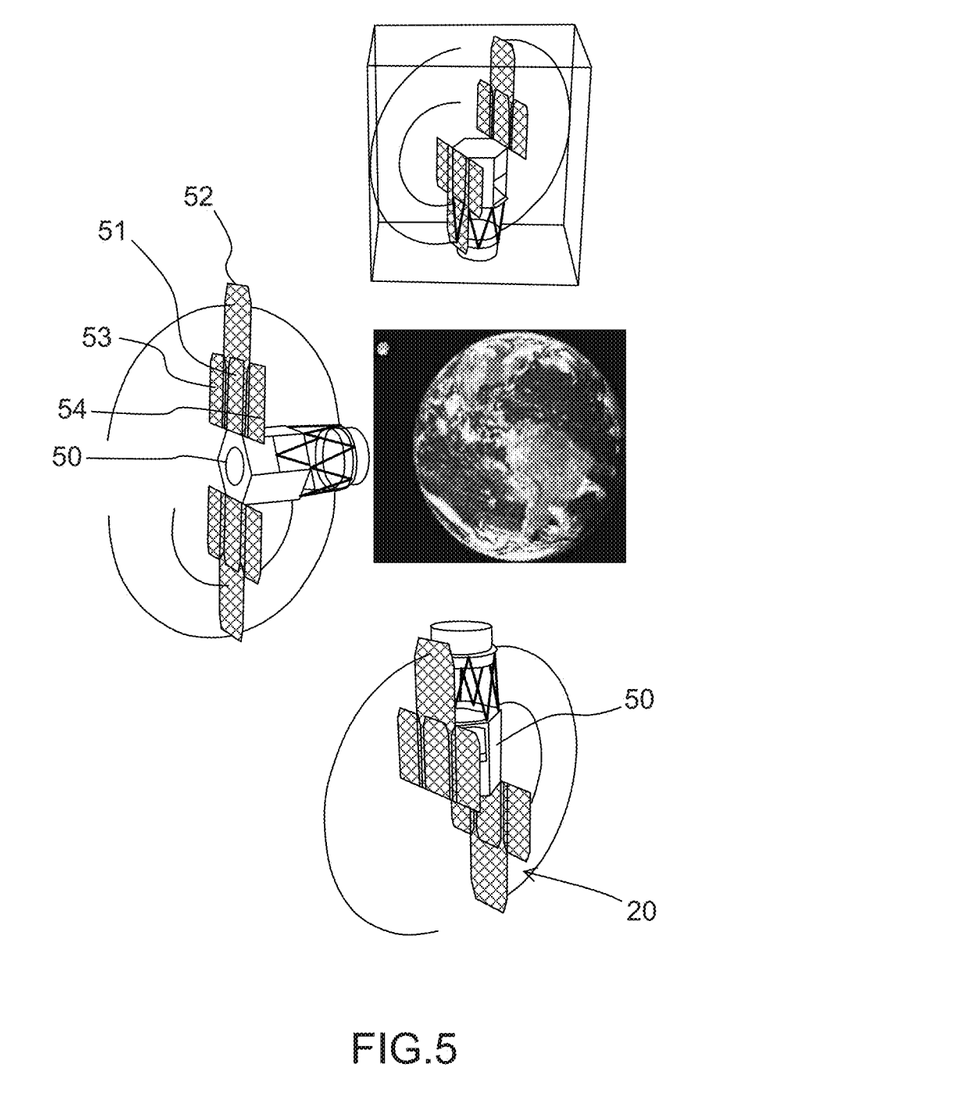
FIG. 5 represents different successive positions around the Earth of an observation satellite according to the invention.

FIG. 5 represents different successive positions around the Earth of a satellite 50 according to the invention. In other words, the supporting structure is the satellite 50. The deployable structure comprises a set 20 of panels 51, 52 53, 54, each of the panels being linked to the adjacent panel by a hinge defining an intermediate axis of rotation, and the set of panels is only rotationally mobile about the main axis of rotation in deployed configuration so as to orient the set of panels relative to the satellite 50. It will be noted in passing that the invention applies to a set of panels comprising more than two panels, as represented in FIG. 5. The set 20 of panels can comprise what are called main panels such as the panels 51 and 52 and what are called secondary panels 53, 54 linked to one or more main panels by an intermediate link. On the same principle, other panels can quite possibly also be linked to the secondary panels, so as to form any possible configuration of the set of panels.

FIG. 5 represents a satellite 50 in observation mission around the Earth that has to both perform an aiming towards the ground in order to take one or more images of the Earth or download data to a station positioned on the ground and to correctly orient the set 20 of panels towards the sun so as to effectively charge the battery to make the equipment on board the satellite 50 operate. By virtue of the invention, in a trajectory going from the south pole to the north pole, it can be seen that the satellite 50 always aims towards the Earth, which makes it possible to perform the observation mission as desired. And, depending on the position of the satellite 50 around the Earth and therefore depending on its orientation relative to the sun, the set of panels is rotationally mobile about the main axis of rotation in deployed configuration. Thus, the set 20 of panels is orientable relative to the supporting structure and oriented optimally to collect the solar flux. Since the orientation of the set of solar panels is optimal, there is no need to provide an excessively large number thereof. Thus, the satellite 50 can perform its observation mission without suffering a weight and bulk penalty due to the solar panels.

Thus, the satellite can always aim towards the Earth and the set 20 of panels can be oriented towards the sun in order to provide the required energy and make the embedded equipment on board the satellite operate. The invention therefore offers the advantage of addressing both the constraints of aiming towards the ground for the observation mission and the effective orientation of the set of panels towards the sun to effectively charge the battery without a weight penalty since there is then no need to provide an excessively large number of solar panels.

Generally, the attitude of the satellite is determined by one or more star trackers, optical devices which measure the position of the stars via photoelectric cells or video cameras and which make it possible to deduce therefrom the attitude of the satellite. These optical devices cannot look through the panels, which is problematical when the satellite is equipped with a large number of sets of panels. The invention also makes it possible to solve this problem since it allows, as explained above, for a space saving because of the limited number of sets of panels.

Furthermore, since the satellite has only a single main link for the orientation of the set of panels, the control of the satellite is not penalized. In effect, each additional link between the supporting structure and the panels represents an additional weak point in terms of vibration mode. In the presence of several links, it is then necessary to damp the modes of the set of panels with mechanical systems that add a weight constraint, an additional manufacturing cost and complexity of use. The invention solves this problem by virtue of its articulation device for the set of panels. The first bending mode is controlled by the articulation device which makes it possible to control the vibrations through the control device. If there are vibrations in the set of panels, the control device can send the command to the gear motor to damp the vibrations.

Moreover, the separation between the first bearing and the second bearing along the first edge of the first panel increases the stiffness of the set of panels by virtue of a better rigidity and allows for a better frequency control.

The invention claimed is:

1. A deployable assembly comprising:
 a supporting structure;
 a set of panels, a first panel of the set of panels being linked to an adjacent second panel of the set of panels by a hinge defining an intermediate axis of rotation, capable of switching from a stowed configuration in which the panels are folded one on top of the other to a deployed configuration, by rotation of the panels about the intermediate axis of rotation, in which the panels are arranged in a same plane;
 an articulation device defining a main axis of rotation of the set of panels relative to the supporting structure, wherein;
 the main axis of rotation is provided along a first edge of the first panel and along a face of the supporting structure;
 the set of panels is rotationally mobile about the intermediate axis of rotation and the main axis of rotation to switch from the stowed configuration to the deployed configuration;
 the set of panels is only rotationally mobile about the main axis of rotation in deployed configuration so as to orient the set of panels relative to the supporting structure;
 wherein, the articulation device further comprises:
 a first bearing on the first edge of the first panel; and
 a control device comprising:
 a gear motor coupled to the first bearing intended to orient the set of panels;
 at least one damper coupling the gear motor and the first bearing;
 a sensor capable of determining the position of the set of panels; and
 a servo for control of the gear motor as a function of the position of the set of panels about the main axis of rotation.

2. The deployable assembly according to claim 1, wherein each of the panels have edges, and the intermediate axis of rotation is on non-adjacent edges.

3. The deployable assembly according to claim 1, wherein the main axis of rotation and the intermediate axis of rotation are parallel axes.

4. The deployable assembly according to claim 1, wherein the articulation device comprises two bearings on the first edge of the first panel so as to render the set of panels rotationally mobile about the main axis of rotation.

5. The deployable assembly according to claim 1, wherein the panels are solar panels and wherein the supporting structure is a satellite.

6. A deployable assembly comprising:
 a supporting structure;
 a set of panels, a first panel of the set of panels being linked to an adjacent second panel of the set of panels by a hinge defining an intermediate axis of rotation, capable of switching from a stowed configuration in which the panels are folded one on top of the other to a deployed configuration, by rotation of the panels about the intermediate axis of rotation, in which the panels are arranged in a same plane;

an articulation device defining a main axis of rotation of the set of panels relative to the supporting structure, wherein;

the main axis of rotation is provided along a first edge of the first panel and along a face of the supporting structure;

the set of panels is rotationally mobile about the intermediate axis of rotation and the main axis of rotation to switch from the stowed configuration to the deployed configuration;

the set of panels is only rotationally mobile about the main axis of rotation in deployed configuration so as to orient the set of panels relative to the supporting structure;

wherein, the articulation device further comprises:

a first bearing on the first edge of the first panel;

a second bearing on the first edge of the first panel; and a control device comprising:

a gear motor coupled to the first bearing intended to orient the set of panels;

at least one damper coupling the gear motor and the first bearing;

a prestressing means associated with the second bearing making it possible to avoid any play in the first bearing and the second bearing.

* * * * *